United States Patent [19]

Atherton

[11] Patent Number: 5,305,221
[45] Date of Patent: Apr. 19, 1994

[54] REAL WORLD MODELING AND CONTROL PROCESS FOR INTEGRATED MANUFACTURING EQUIPMENT

[76] Inventor: Robert W. Atherton, 1694 Miller Ave., Los Altos, Calif. 94024

[21] Appl. No.: 518,953

[22] Filed: May 4, 1990

[51] Int. Cl.$^5$ .............................................. G06F 15/46
[52] U.S. Cl. .................... 364/468; 364/149; 364/156; 364/478
[58] Field of Search ............... 364/468, 469, 148, 150, 364/151, 401, 402, 403, 478, 578, 156

[56] References Cited

U.S. PATENT DOCUMENTS

| | | | |
|---|---|---|---|
| 4,628,435 | 12/1986 | Tashiro et al. | 364/468 |
| 4,638,227 | 1/1987 | Katayama et al. | 364/184 |
| 4,648,766 | 10/1987 | Entwistle et al. | 364/468 |
| 4,796,194 | 1/1989 | Atherton | 364/468 |
| 4,852,001 | 7/1989 | Tsushima et al. | 364/468 |
| 4,896,269 | 1/1990 | Tong | 364/468 |
| 5,053,970 | 10/1991 | Kurihara et al. | 364/468 |

OTHER PUBLICATIONS

E. A. Elsayed and T. O. Boucher, *Analysis and Control of Production Systems*, Prentice-Hall, Englewood Cliffs, N.J., 1985, pp. 4-5 and 226-227.

*Primary Examiner*—Jerry Smith
*Assistant Examiner*—Thomas E. Brown
*Attorney, Agent, or Firm*—Cooley Godward Castro Huddleson & Tatum

[57] ABSTRACT

This process models production integrated processing equipment, also known as cluster tools, modular equipment, track systems, etc. Further, the model produced by this invention is a real-world model, i.e., it is realistic and validatable. In addition, the invention provides a process for developing machine-specific implementations for PIPEs performing such complex processes as plasma etching, plasma deposition, chemical-vapor deposition, physical-vapor deposition, photolithography, photo-resist processing, rapid thermal processing, and oxidation, as well as other processes. The PIPE-specific model can be used for performance analysis. The effect of changes in process times, process recipes, and process mixtures on cycle time, throughput, resource utilization, and bottlenecks can be analyzed. These PIPE models may be used in the design or redesign of PIPEs. Further, the PIPE-specific model can be used to control material movement in the PIPE, including buffer dynamics to avoid machine lock-up. The PIPE-specific models may be used as part of computer-integrated manufacturing systems that control factories. The real-world modeling and control of these complex PIPE systems has become necessary with the recent introduction of such integrated equipment.

31 Claims, 9 Drawing Sheets

REAL WORLD MODELING AND CONTROL PROCESS FOR INTEGRATED MANUFACTURING EQUIPMENT

BACKGROUND OF THE INVENTION

1. Field of the Invention

The present invention relates generally to a process for the modeling and control of production integrated-processing equipment (PIPE). It further relates to a class of PIPEs which have operations sequences. It also relates to the use of PIPE-specific models to control material movement within the PIPE and loadings of the PIPE. It also relates to the use of such PIPE-specific models to analyze and extrapolate PIPE performance. It also relates to the use of PIPE-specific models to evaluate and develop PIPE designs and PIPE control schemes. The invention further relates to a computer integrated manufacturing (CIM) system that includes a PIPE-specific model for automatic PIPE control and to the use of PIPE-specific models in the design of CIM systems.

2. Description of the Prior Art:

Many manufacturing plants or factories are using or introducing highly-complex production integrated-processing equipment (PIPE). This integrated equipment is also known as modular equipment or cluster tools. PIPEs are capable of performing multiple, independent processing steps without leaving a controlled environment. By performing sequences of processing steps in one machine, substantial yield improvements over conventional processing equipment may result. This automated processing reduces contamination and unnecessary human handling. The complexity of this integrated equipment, however, introduces severe problems in analysis of the PIPE performance.

Prior to this invention, PIPE manufacturers and users have taken one of two approaches to understand PIPE performance: spreadsheets or physical experimentation. Spreadsheets provide a basis for approximate analytic calculations. While such an approach results in computer calculations that provide impressive-looking numeric results, little or no effort is expended in establishing the underlying accuracy of such spreadsheet calculations. A major area of approximation is the description of internal movement through the PIPE. This internal material movement is complex, and poorly understood. One approximation in spreadsheet calculations has been to surrender to this complexity and describe the operations sequence or path through the PIPE as being random.

The second approach taken by PIPE manufacturers and users has been physical experimentation. There is clearly a need for performance analysis, especially with regard to throughput and cycle time, since PIPEs, in general, are multi-million dollar pieces of equipment. A single physical experiment can cost tens-of-thousands of dollars and provide only one data point. The need for performance analysis has compelled manufacturers and users to perform such experiments in order to improve on the accuracy of spreadsheets. Millions of dollars may be spent doing performance analysis by this method. Any answers obtained by this method are case-specific, and any change in physical design, operating conditions, or recipes will negate the results and require repeating the effort.

Performance Analysis and PIPE Productivity

One of the goals of performance analysis is to calculate the cycle time of a standard manufacturing unit, i.e., part, lot, or cassette, as a function of process recipe. The process recipe is the set of processing steps to be performed by the PIPE. Despite the processing advantages provided by PIPEs, realistic calculations of throughput and capital cost per part impact the user's choice of a PIPE for a particular process step or steps. The calculation of throughput of a PIPE workstation is based primarily on the PIPE's cycle time.

Table 1 demonstrates the impact of cycle time on the capital cost per part. In this example, 25-wafer cassettes are being processed by a PIPE. The PIPE in this example has a modest capital cost of $1 mm which is amortized over 5 years. The capital cost per part is a direct function of the cycle time of the cassette in the PIPE. A variation of a factor of four in cycle time results in a variation of a factor of four in the capital cost per part. Clearly the accurate calculation of PIPE cycle time is crucial information in making decisions on equipment selection and numbers of machines needed at a workstation. Further, the total operating cost per wafer may be twice the capital cost.

TABLE 1

| PIPE PRODUCTIVITY vs CYCLE TIME | | |
|---|---|---|
| ASSUMPTIONS: | | |
| PIPE CAPITAL COST = $1,000,000 | | |
| 5 YEAR AMORTIZATION ($200,000/yr) | | |
| 325 WORK DAYS ($615 in amortization/d) | | |
| 20 PROCESSING HOURS PER DAY | | |
|  | CASE 1 | CASE 2 |
| CYCLE TIME | 0.5 HRS | 2 HRS |
| # CASSETTES/d | 40 | 10 |
| COST/CASSETTES | $15.38 | $61.50 |
| COST/Part | $0.62 | $2.45 |

MINI-FACTORY

In performing multiple process steps, the PIPE is no longer a simple machine, but is in reality a mini-factory. Like a factory, the cycle time of individual parts, and consequently of lots of parts, has time components that include transport, wait, and process. This simple observation explains why performance analysis of the PIPE is so much more complicated than for conventional processing equipment. When a part completes its operation sequence in the PIPE, its cycle time is a sum of its processing times, transport times, and wait times.

Figure 1:
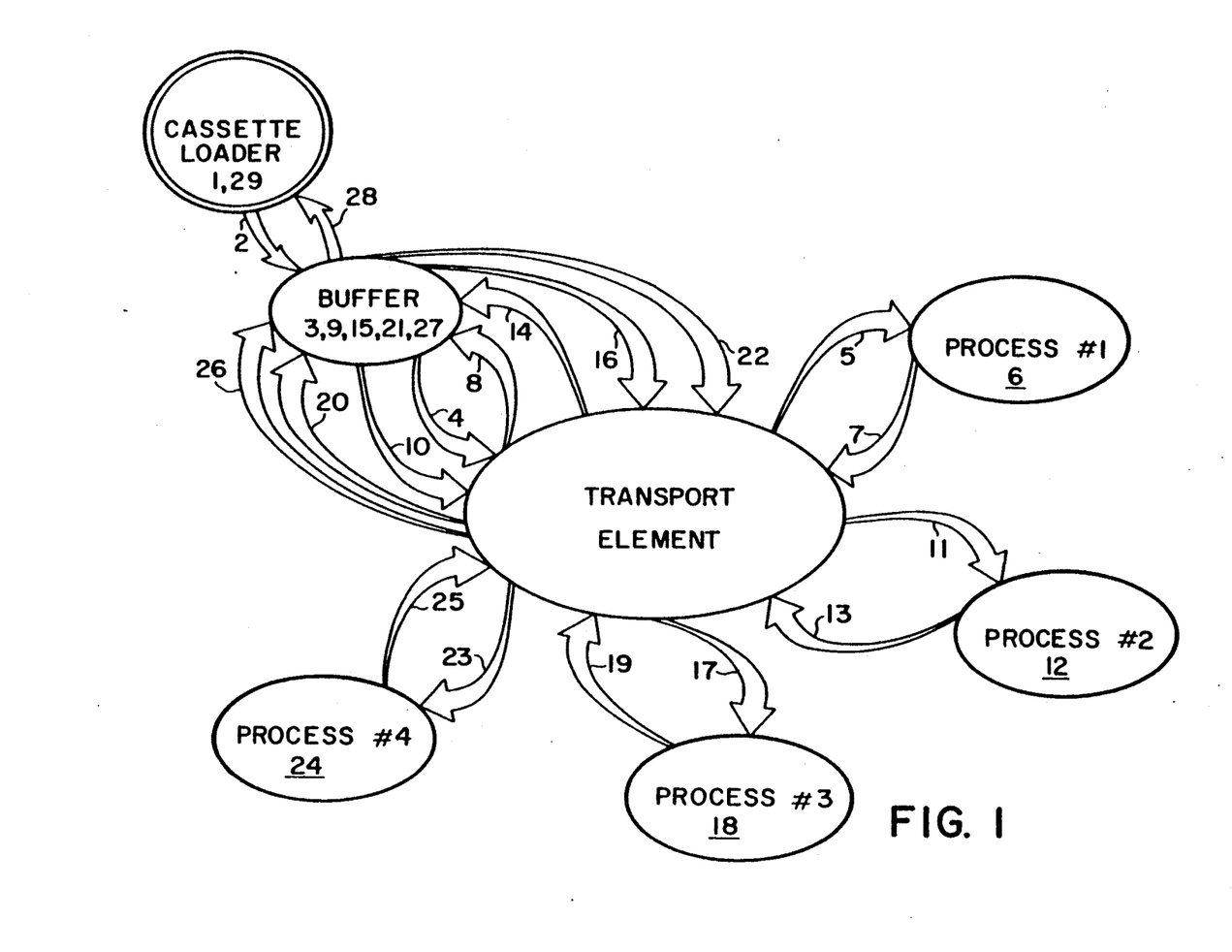
FIG. 1 is a flow diagram in the form of an operations graph, useful for understanding the present invention.

For example, as shown in FIG. 1, a four-step process recipe within a PIPE may require nearly 30 operational steps, each having a time element associated with it. This set of operations steps is called the operations sequence. Thus, the cycle time for a part or lot may be over twice the cycle time expected from processing times alone. This operational complexity explains why spreadsheet calculations are wrong and misleading.

An accurate performance analysis of a PIPE predicts the throughput of the machine and the cycle time of material in the machine as a function of equipment design, process recipe, and operating conditions. Without accurate performance analyses, operation of the PIPE is difficult to control. Further, accurate performance analyses are imperative for design improvement.

MANAGING COMPLEXITY

In order to effectively design and use PIPEs, an understanding of buffer dynamics and of the competition for processing resources must be understood and correctly modeled. In one PIPE design, parts may spend time in the process chamber waiting for the next processing step. In a second design, an internal buffer may be provided, and parts may move to this internal buffer if no processing resource is available. In a third design, multiple process chambers may be capable of performing the same process step. This last design may be used in conjunction with either waiting in the chamber or the internal buffer.

Further complexity in PIPE analysis results if the path of the part through the machine is dependent on the dynamic condition of the machine. For example, in a design with an internal buffer, a part may spend additional time in the buffer if the next processing chamber is unavailable. The use of buffers may ease congestion, but may not necessarily shorten cycle time. However, use of the buffer will also acquire additional transport time in addition to the wait time. Thus, the additional transport times in the PIPE can be critical in establishing cycle-time performance.

Due to the recent appearance of this equipment and its inherent complexity, PIPE performance analysis, PIPE modeling, and the use of models in PIPE control, design, and design improvements have heretofore not existed prior to this invention. Since the PIPE is a mini-factory, the closest prior art is in the related field of real-world factory modeling. The closest prior art is U.S. Pat. No. 4,796,194, Robert W. Atherton, "Real World Modeling and Control Process".

SUMMARY OF THE INVENTION

Accordingly, it is an object of this invention to provide a method for modeling, analysis, design, and control of production integrated processing equipment (PIPE) which has operations sequences.

It is another object of the invention to provide such a method which can be used with PIPEs involved in complex processes and processing sequences, such as photolithography, photo resist processing, plasma etching, plasma deposition, wet etching, chemical vapor deposition, physical vapor deposition, plasma cleaning, and measurement or inspection of materials or parts.

It is a further object of the invention to provide such a method which starts with an analysis of actual PIPE operation, rather than a theoretical or mathematical approach.

It is still another object of the invention to provide a process for modeling a PIPE which develops concrete descriptions of specific machines.

It is a still further object of the invention to provide such a modeling process which provides a dynamic model for a PIPE which has an operations sequence.

It is yet another object of the invention to provide such a modeling process which will simulate the behavior of the PIPE in detail.

It is another object of the invention to provide such a modeling process in which the model is validated with actual operating data for the PIPE.

It is a further object of the invention to provide such a modeling process which characterizes PIPE operation accurately enough so that the model can be used for automatic control of the PIPE.

It is yet another object of the invention to provide such a modeling process wherein automatic control of the PIPE is included in a computer-integrated manufacturing production control system.

It is another object of the invention to provide such a modeling process that will provide sizing data and design data for determining changes, additions, and/or improvements to the PIPE.

It is another object of the invention to provide a modeling process that will provide control strategies that will determine and prevent PIPE "lock-up".

The attainment of these and related objects may be achieved through use of the novel process for modeling, analysis, design, and control of production integrated-processing equipment herein disclosed. In one aspect of the invention, a modeling process in accordance with this invention includes delineating a set of PIPE operating rules which define how materials or parts interact with machine components in actual operation of the machine. The machine is defined by specifying physical components of the machine and their interconnections. Other parameters which are specified are timings of each operation in the operations sequence, batch sizes, and process recipes. The process steps in the process recipe(s) are assigned to the specific processing elements. The time of each process step is defined. Those phenomena in the PIPE which are stochastic in nature are identified. Distributions and parameters of the distributions are assigned to the stochastic phenomena.

The model obtained by this process is used to simulate operation of the PIPE. Predictions obtained with the simulation are compared with observed operations trends in the PIPE. The comparison is used to refine choice of fundamental rules and parameters in the model. The invention provides PIPE-specific models for all integrated processing equipment which have operations sequences.

Because the modeling process of this invention starts with a definition of how a PIPE actually operates, rather than a mathematical theory which ultimately leads to a definition of the PIPE operation, this modeling process is able to handle very complex PIPEs and processes, such as those used in the manufacture of integrated circuits. However, the results obtained with this process should make it of use in a wide variety of other PIPE applications and processes as well.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

The following nonlimiting examples represent preferred embodiments of the invention and describe the invention further.

Example 1: PIPE Using Dynamic Routing

Figure 2:
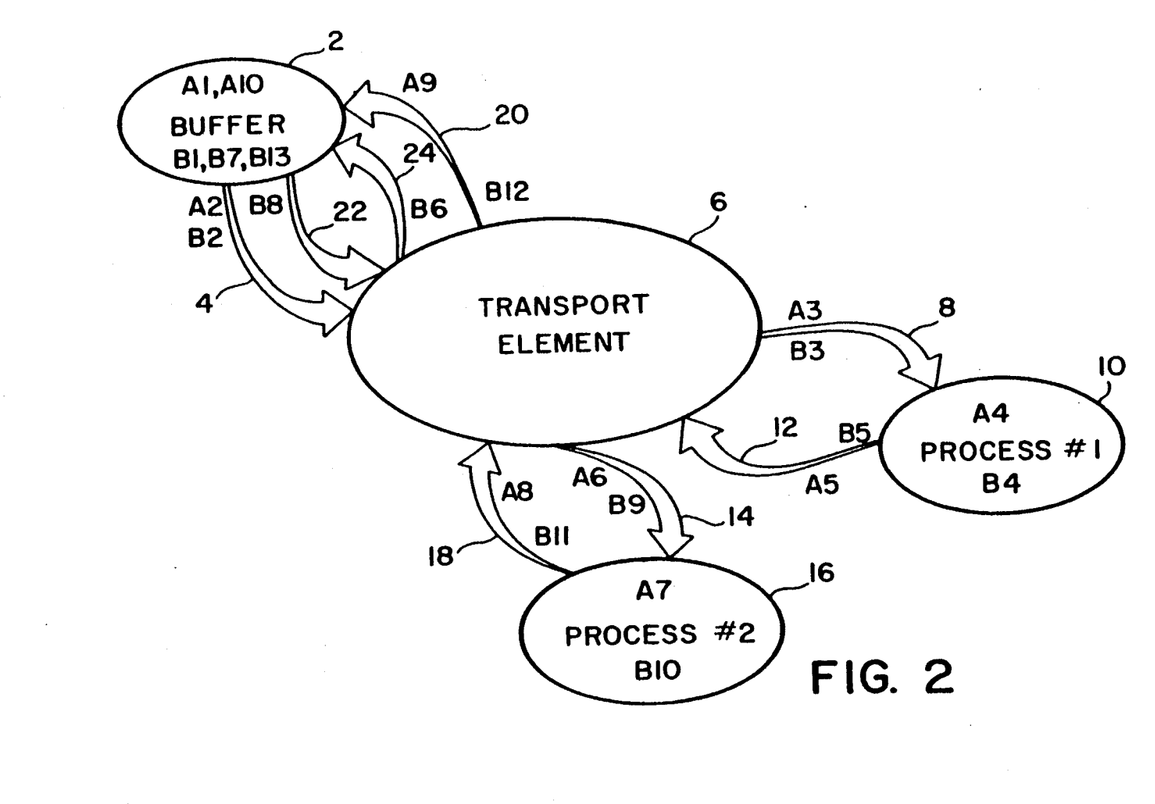
FIG. 2 is a flow diagram in the form of an operations graph, showing the operations sequences representative of a first embodiment of the invention.

Turning now to the drawings, more particularly to FIG. 2, there is shown a PIPE, which consists of a buffer for waiting, 2, a Transport Element, 6, and two Processing Chambers, labeled as 10 and 16. For this illustration, here are two operations sequences A1-A10 and B1-B13. The convention on used in this directed multigraph is that directed arcs indicate a transition from one PIPE component to another and that an operations step (i.e., a process step, a transport, or a wait) is performed at the PIPE component at the end of the arc. 'START' is present to reflect any portions of the operation, such as loading or pumping, that occur prior to the beginning of this illustration. Likewise, 'FINISH' reflects any portions of the operations sequence which occur after this illustration. The operations sequences for this example consist of all the arcs from start to completion. Table 1 below shows important characteristics of the PIPE component.

TABLE 2

| | Components in a PIPE | | |
|---|---|---|---|
| Label | Type | # Elements | Batch Size |
| 2. | Buffer | 1 | 8 |
| 6. | Transport Element | 1 | 1 |
| 10. | Process Chamber #1 | 1 | 1 |
| 16. | Process Chamber #2 | 1 | 1 |

The operations sequence defines how the parts move through the various elements of the PIPE. For this case, where the PIPE performs a simple two-processing-step recipe, there are at least two possible operations sequences, depending on whether the second Processing Chamber is occupied when materials or parts complete processing in the first Chamber. The consequence of the second being occupied is that additional operations will be required so that the part can return to the buffer to wait (operations sequence B1-B13). If, however, the second chamber is available, then the part completing processing in the first chamber will flow directly through the PIPE without incurring additional operations steps and wait times (operations sequence A1-A10).

For operations sequence B1-B13, a simple two process-step recipe results in a surprising thirteen-step operations sequence.

As shown by FIG. 2, the dynamics of material movement through integrated processing equipment can be complex, and even unanticipated. The PIPE operations sequence for this case is:

(1) time in buffer
(2) buffer to Transport Element
(3) Transport Element to process chamber #1
(4) time in process chamber #1
(5) process step #1 to Transport Element
(6) Transport Element to buffer
(7) time in buffer
(8) buffer to Transport Element
(9) Transport Element to process chamber #2
(10) time in process chamber #2
(11) process step #2 to Transport Element
(12) Transport Element to buffer
(13) time in buffer The operations sequence is not necessarily the same for each part in a batch. The complexity of material movement in the PIPE is caused, in part, by the requirement for a part to spend wait time in a buffer if a downstream Processing Chamber is unavailable. The decision on whether the part returns to the buffer or moves on to the next Processing Chamber may only be made immediately prior to scheduling the next part movement. The first part in a batch will experience no resource conflict and thus will flow directly through the PIPE.

In this particular illustration, only one product is being processed in the PIPE. However, more than one product may be in the PIPE at one time and may compete for PIPE resources. Each product is differentiated by a change in the process-step parameters for one or more steps. While this diagram is becoming complex with only one product, two Processing Chambers, one buffer, and two operations sequences, real-world situations may have several products competing for PIPE resources of four to ten Processing Chambers, and numerous buffers. Such a real-world situation, could have hundreds of possible PIPE operations sequences. For example, one product using a four-step recipe, in four Processing Chambers, with one buffer, has seven operations sequences (i.e., a part may take one of seven routes through the PIPE). This real world complexity prevents accurate representation of the PIPE operations sequences without this invention. While we can not usefully draw an operations graph representing all possible operations sequences, the computer can input, store, and compute with a mathematical representation of the hundreds of operations sequences.

Example 2: PIPE Using Strict Routing

Figure 3:
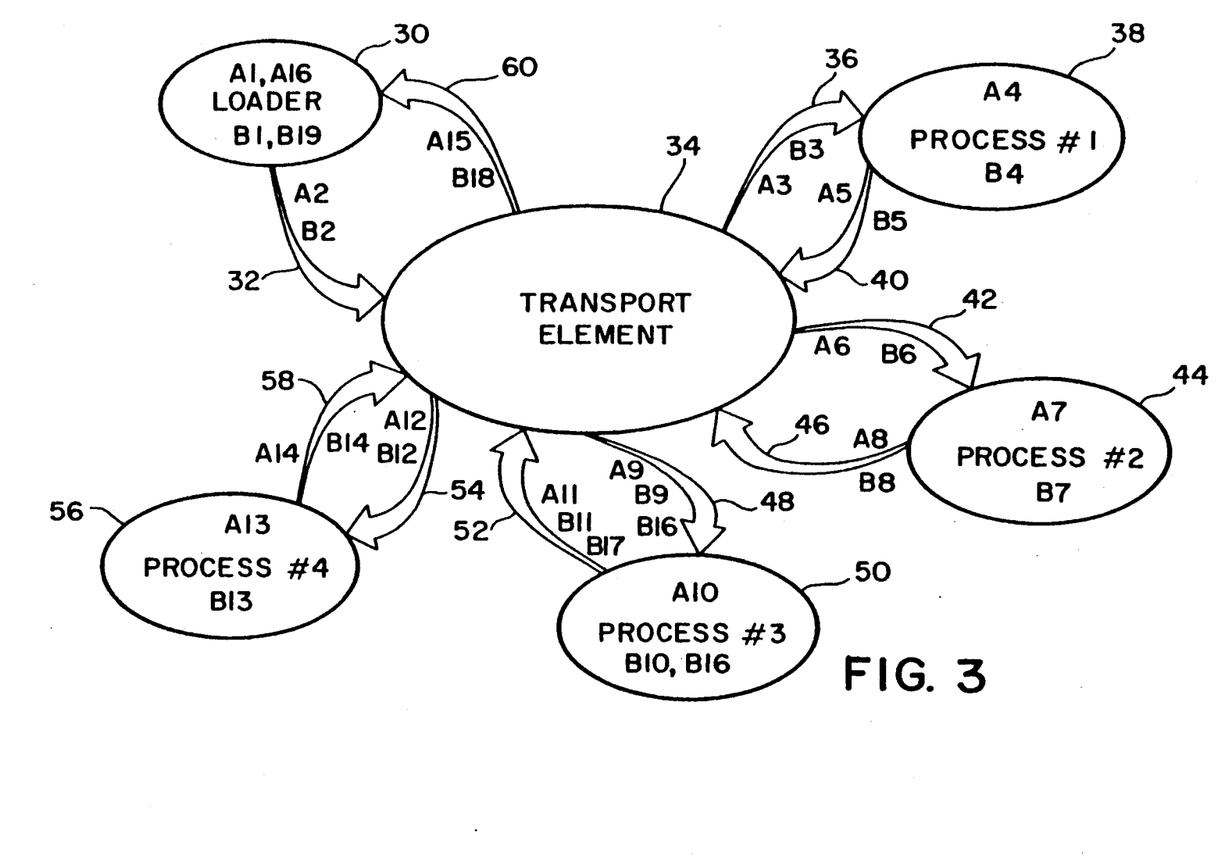
FIG. 3 is another flow diagram in the form of an operations graph, showing the operations sequences representative of a second embodiment of the invention.

FIG. 3 provides a representation of a PIPE which does not have buffers, per se, but observes strict routing of all parts through the PIPE. In this case, if a downstream PIPE component is occupied, the part will wait in the Processing Chamber until the next chamber in its fabrication sequence is available. Although this type of PIPE is less complex as far as the dynamics of parts movement through the PIPE, substantial wait times may be involved which tie up valuable processing resources. Determining these wait times is crucial to determining the cycle time of parts in the PIPE. For example, FIG. 3 shows a PIPE that may perform four or more process steps. For this example, a case of four process steps, A1-A16, and a case of five process steps, B1-B19, will be considered.

For the case of four process steps, A1-A16, parts may wait in the Processing Chambers (38, 44, 50, 56) whenever the next chamber in the processing sequence is occupied. In the worst case scenario, each succeeding processing time may be longer than the first, i.e., $t_1 < t_2 < t_3 < t_4$. Thus, only the first part in each batch will not accrue wait times as a result of an occupied downstream chamber. All other succeeding parts will accrue substantial wait times. To illustrate, assume that $t1=10$ min, $t2=22$ min, $t3=44$ min, and $t4=68$ min. The total processing time is 144 minutes; the total time that parts (other than the first part) spend waiting for a chamber to become available is 58 minutes. Thus, of the total time that a part spends in the processing chambers (202 minutes), over 25% of the time is simply spent waiting.

The wait time may become even longer, and more complex, if a part returns to a chamber for another processing step. For the operations sequence B1-B19 in FIG. 3, it is no longer possible to determine the total wait time for parts without this invention. For this operations sequence, the part will move from Processing Chamber #1, 38, to Chamber #2, 44, to Chamber #3, 50, to Chamber #4, 56, then back to Chamber #3, 50. The decision on whether the part may return to Processing Chamber #3 may only be made immediately prior to scheduling the movement. Parts are now competing for this Process Chamber.

In order to fully understand this example, it is necessary to define the concept of machine lock up, which this invention will prevent. In lock up, the machine is in a state where the operations sequence and control rules allow no further operations. The machine is literally locked up or "frozen". Thus, if at some point in the operations sequence, the wrong decision is made regarding which part utilizes a resource, lock up will occur.

In this example, the first part will be ready to return to Chamber #3 after 144 minutes in the PIPE. However, at time $t_B1$ 10 min, part #2 starts its fabrication sequence in the PIPE. At 144 minutes, both the first part and the second part are ready to enter Chamber #3. If the incorrect choice is made, and part #2 enters Chamber #3, the machine will "lock up". Under this scenario, when part #2 is through processing in Chamber #3, it will be ready to move to Chamber #4. Chamber #4, however, still contains part #1 which is waiting to return to Chamber #3. Now, neither part has a place to go.

Under the other scenario, if at 144 minutes part #1 returns to Chamber #3 for an additional processing step of 44 minutes, part #2 will wait an additional 44 minutes in Chamber #2, part #3 will wait in Chamber #1, etc. Part #1, however, will complete its fabrication sequence in the PIPE and withdraw from the competition for resources. The second part will not enter Chamber #3 until 188 minutes, and will not be through processing until 308 minutes. Whereas part #1 had a cycle time in the PIPE of about 188 minutes, the cycle time of part #2 is well over 300 minutes. Subsequent parts are likely to face a severe competition for resources, leading to long and impossible-to-predict cycle times without this invention.

Example 3: A PIPE with a Transport Element and Complex Processing

Figure 4:
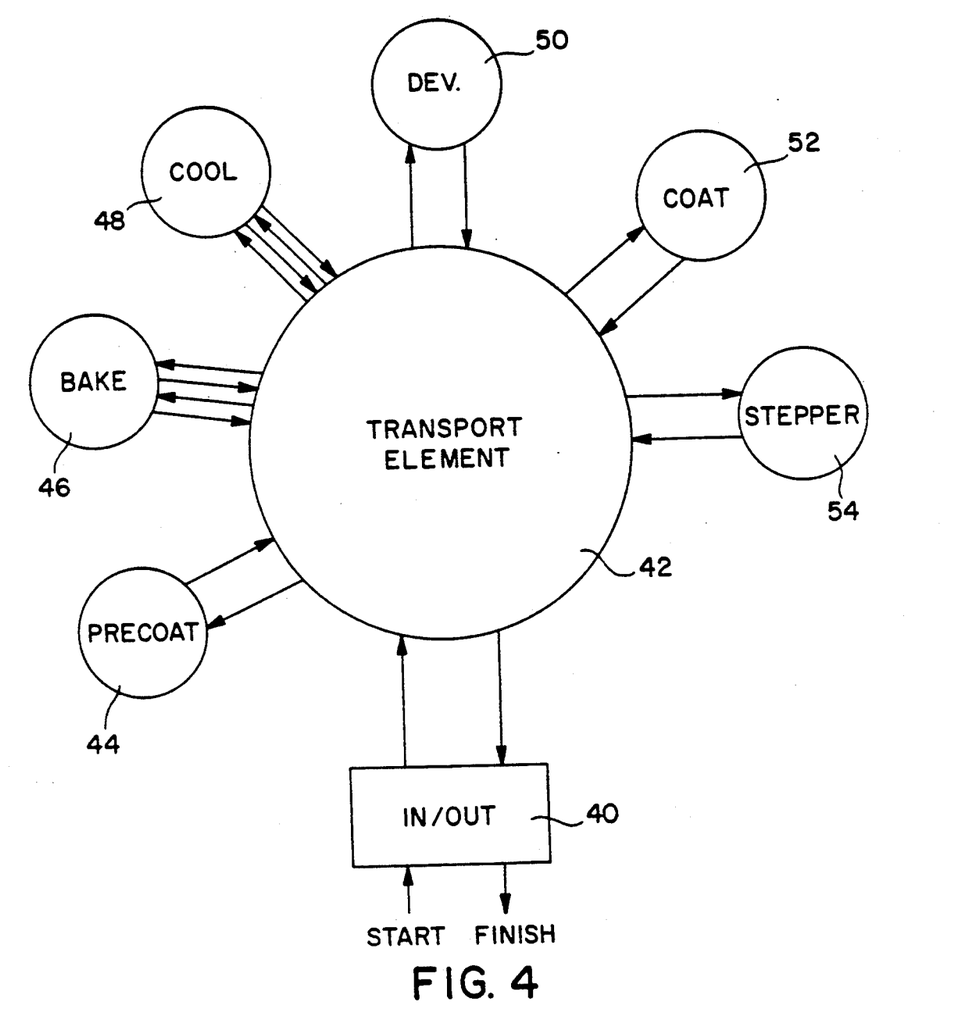
FIG. 4 is a further flow diagram in the form of an operations graph, showing the operations sequences representative of a third embodiment of the invention.

FIG. 4 shows another example of a PIPE. This machine is characterized by a relatively large number of processing resources, 40-54, and a relatively long process recipe for parts in the PIPE. In this particular example, there are six processing chambers, 44-54, for the recipe steps. As a result of this processing complexity, the Transport Element, 42, has a high demand placed upon it. In this example, each part has eighteen distinct transport steps in its operations sequence. A consequence of this large number of steps is that this machine will have a greater tendency to lock-up if inappropriate control rules are chosen.

A particular example of such a machine is a track system for photoresist processing in semiconductor part fabrication. The process steps involved in the processing recipe are: precoat, 44, coat, 52, bake, 46, cool, 48, develop, 50, and stepper, 54.

Example 4: Process for Building a PIPE Model

Figure 5:
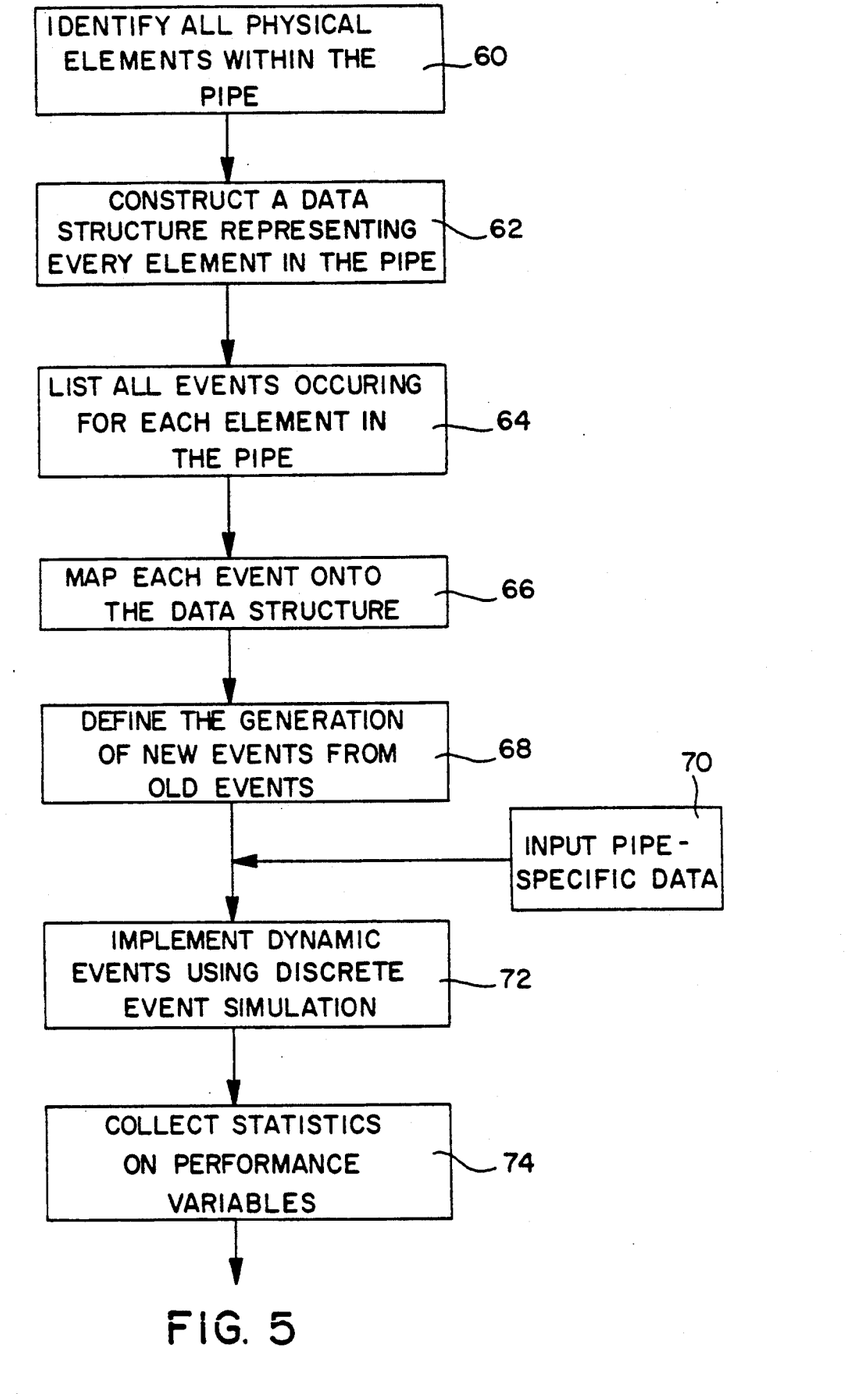
FIG. 5 is another flow diagram illustrating the process for building PIPE models.
Figure 6:
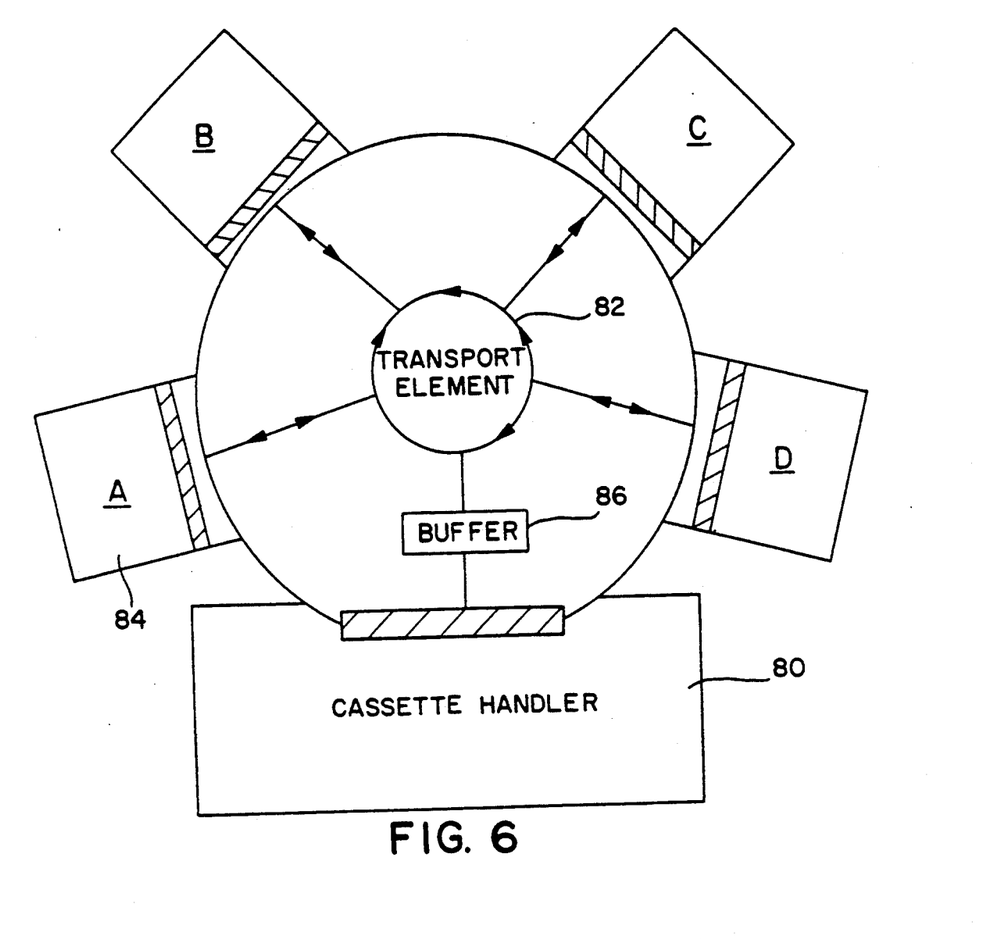
FIG. 6 is a generic schematic of a PIPE.

FIG. 5 provides a flow diagram of the process for building a PIPE model. In the diagram, each block 60-74 represents a step in constructing a model that mimics the interaction of materials and PIPE elements. This process produces a model that encompasses all integrated processing equipment. The model becomes PIPE-specific by introducing data tables that parameterize the PIPE-specific "if-then" rules, logic tables, and functions, 70.

As illustrated by the diagram, the first step in the construction of the model is to identify all physical elements in the PIPE, 60. Examples of such physical elements include cassette handlers, Transport Elements, processing modules, and buffers. These physical elements are shown in the PIPE diagram in FIG. 6, 80-86. Other elements may include sensors and pumps. Once identified, a data structure is constructed which represents these elements, 62. Examples of data structures are given in Table 2. These data structures include such information as identifiers, variables for the properties of each element, and linking arrays.

Events that may occur for each PIPE element are then listed. 64. Examples of such events are: start a part, move a part, unload a processing chamber, etc. Each of these events is mapped onto the data structure, 66. For example, the event "start a part" would cause the changes in the data structure which defines the collection of parts available for processing.

In addition, the occurrence of each event will cause the generation of new events which will occur at the present or some future time. The next step in the modeling building is to define these new events which are generated from the old events, 68. For example, "starting a part" makes that part available for an event such as "load Transport Element" with that part.

At this point, a generic PIPE model now exists. In order to implement the model, PIPE-specific data must now be introduced in the form of data tables, 70. These data tables parameterize the "if-then" rules, logic tables, and functions defined above, and thus make the model PIPE-specific.

Starting from some initial event, the rules for the interaction of machine elements and material, and for the generation of future events, allow the propagation of machine behavior into the future. This propagation occurs by generating the complete sequence of events that occur in the PIPE over the time horizon of interest. While such an events generation could, in theory, be accomplished with pencil and paper, due to the complex interactions in PIPEs, it is more conventionally performed using a digital computer. Such a computer simulation is consequently called a discrete-event simulation, 72. The generation of these events is necessary in order to understand the dynamic behavior of the PIPE.

Of more particular interest, however, are summaries of these events (i.e., statistics) that provide measures of equipment performance. Examples are cycle time, throughput, resource utilization, etc. These statistics are fundamental in PIPE performance analysis, PIPE control, and PIPE design.

Example 5: Process for PIPE Performance Analysis

Figure 7:
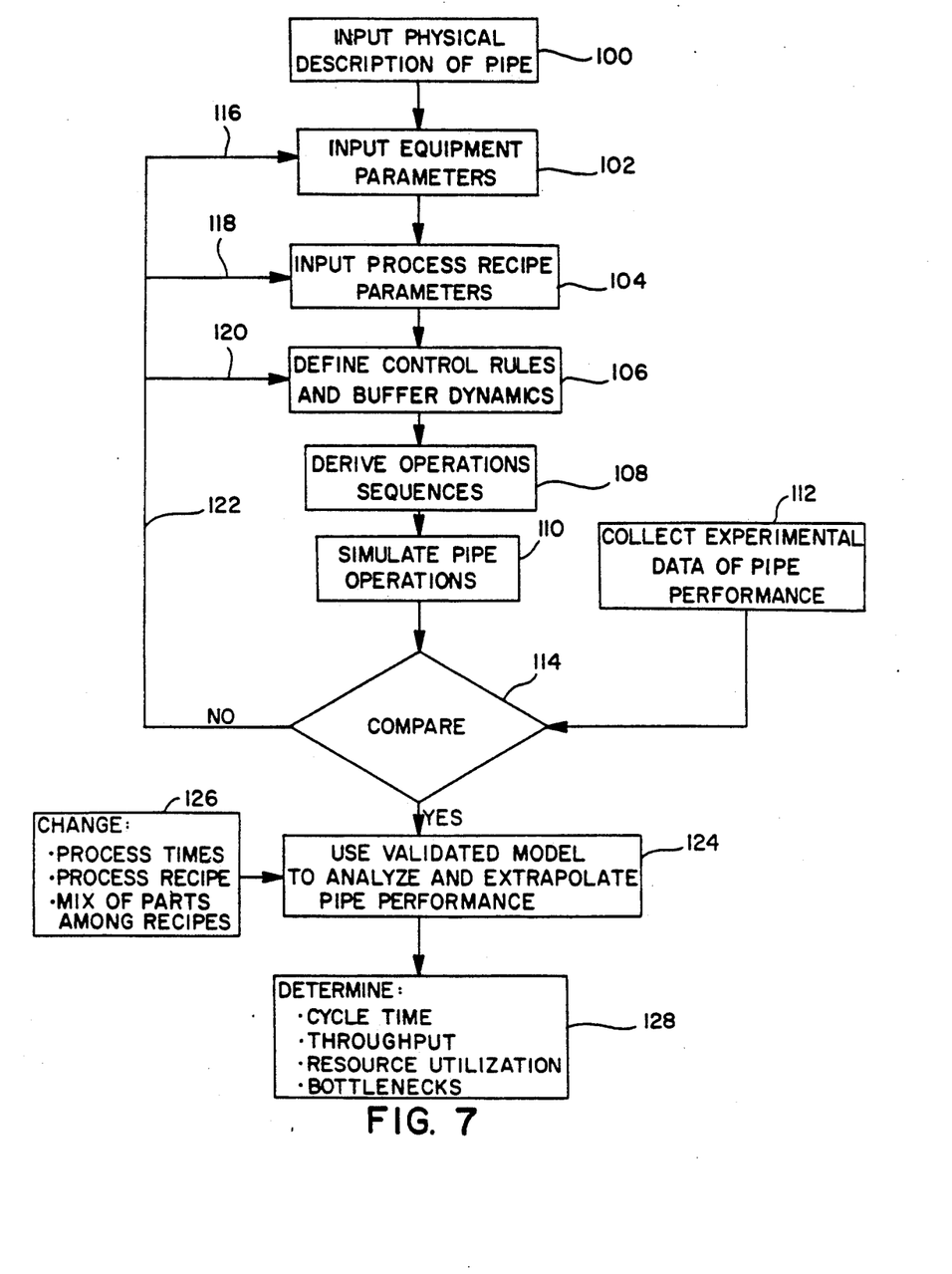
FIG. 7 is still another flow diagram illustrating the process for doing performance analyses of PIPEs.

FIG. 7 shows a flow diagram for the process of using PIPE-specific models for the performance analysis of PIPEs. In the diagram, the blocks, 100-128, represent the steps performed in developing, calibrating, validating, and using the PIPE-specific model in the performance analyses. In general, experimental PIPE performance data will be available for a set of recipes. These data sets are used to calibrate and validate the PIPE model, and in particular to refine the model's descriptions of control rules and buffer dynamics. The validated model can then be used to extrapolate PIPE performance for conditions for which experimental data are not available. Considering the costs of experimentation on this type of equipment, this use of the validated PIPE model is extremely economical.

As illustrated in the diagram, the first step in the process is to input the physical description of the PIPE, 100. Examples of these PIPE elements are shown in FIG. 6, 80-86. In the next step, 102, parameters describing the operation of the equipment are given. Examples are transport times and other timing elements such as for pumping and venting. The next step is to input the process recipe parameters, 104. Examples are process time, setup time, and routing indicators. Control rules and buffer dynamics for the specific PIPE are then defined, 106. From these inputs, the model described in FIG. 5 is able to derive operations sequences for every part being processed in the equipment, 108. A PIPE-specific model now exists and will be used to simulate PIPE operations, 110. In block 112, the collection of experimental data is performed. Experimental PIPE performance data will generally be available for a small set of process recipes. These data sets provide a basis of comparison for PIPE model performance, 114. The model's results should match the experimental data to a high degree of accuracy (90+ %). If the comparison of model predictions with experiment results is not to this accuracy, then refinements are made by evaluating the accuracy of equipment input parameters, 116, process recipe parameters, 118, and control rules and buffer dynamics, 120. As shown, an iterative process of adjusting these parameters, making simulations, and comparing the results with the experimental data is used to calibrate and validate the PIPE model, 122.

Once validated, the PIPE model can be used to analyze and extrapolate PIPE performance, 124. For example, changes in process times, process recipe, and/or mix of parts may be evaluated, 126, for the impact on cycle time, throughput, resource utilization, and bottlenecks, 128.

Example 6: Process for PIPE Design

Figure 8:
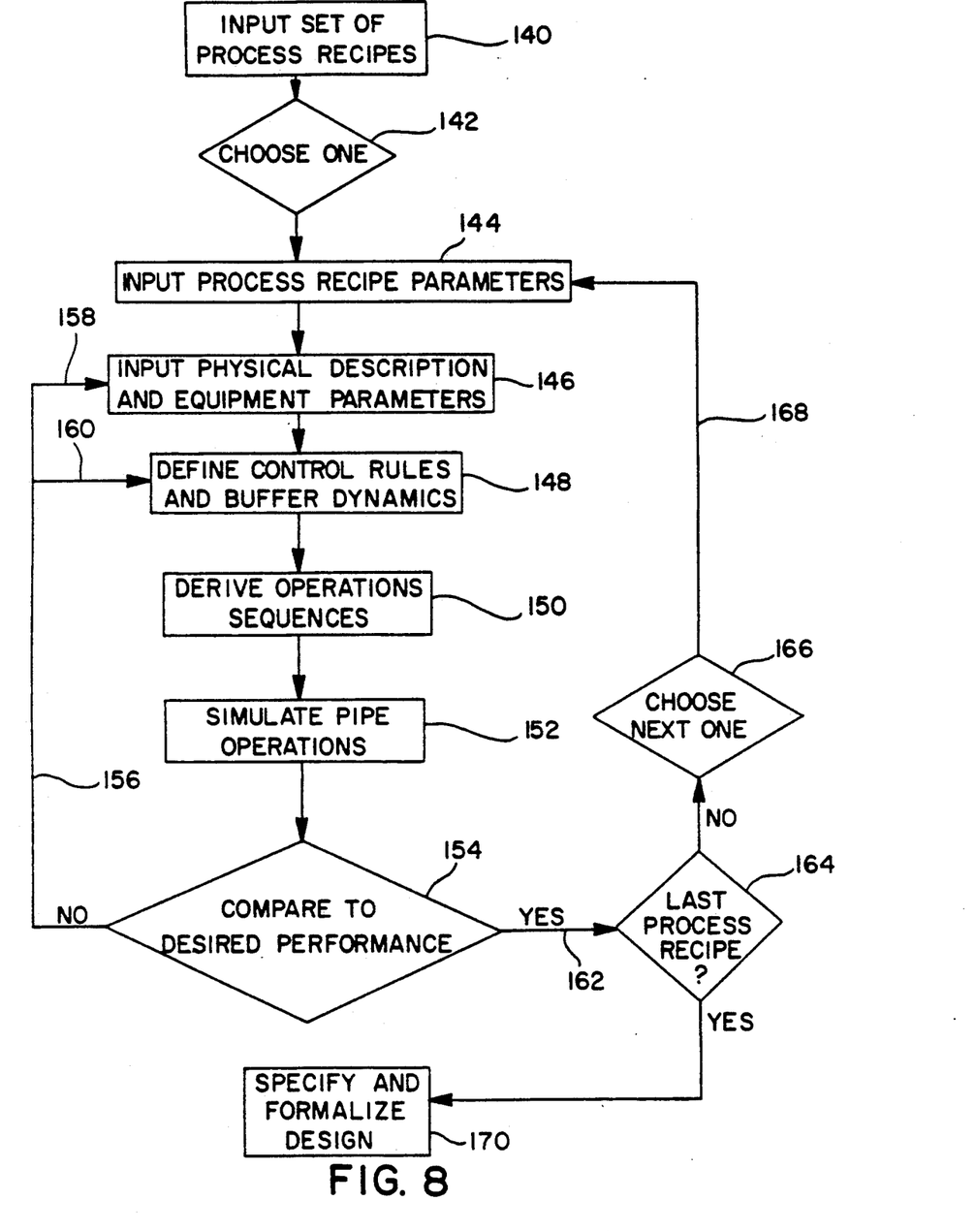
FIG. 8 is yet another flow diagram illustrating the use of PIPE models for PIPE design and redesign.

FIG. 8 provides a flow diagram for the process of using PIPE-specific models in the design or re-design of a PIPE. The effectiveness of this process is realized by comparing this process to the conventional alternative of hardware prototypes. Each hardware prototype may cost millions of dollars and may require in excess of six months to build and evaluate. In contrast, evaluating design alternative in software requires only minutes on a desktop computer.

In the diagram, the blocks, 140-170, represent the process of developing a PIPE design that meets a desired performance for a set of specified process recipes. The object of the design process is to develop a machine that has satisfactory performance for the target set of process recipes. The result of the design process will be a physical description of the machine, machine performance parameters such as transport times, and rules for the control of part movement and of buffers. Alternative choices among all these design variables are evaluated using PIPE modeling.

As illustrated, the first step in the process, 140, is to input the desired set of process recipes for which the PIPE is to be used. From this set, one process recipe is chosen to begin the design process, 142. Based on this process recipe, the process recipe parameters are given, 144. Also, a preliminary physical description of the PIPE is developed and initial equipment parameters are specified, 146. Next, control rules and buffer dynamics are defined based on considerations of the physical layout of the machine and the process recipe, 148. As a result of these choices, a set of operations sequences is derived describing the possible paths for parts movement through the PIPE, 150. The PIPE model is then used for detailed simulation, 152.

The projected behavior of the proposed design is compared to the desired performance specifications, 154. In an iterative process of design, 156, changes in the physical description and equipment parameters, 158, and changes in rules for part movement and buffer behavior, 160, are made and evaluated.

When a satisfactory design for one process recipe from the step is achieved, 162, another process recipe from the set will be evaluated, 166. When a satisfactory design is found for all recipes in the set, then the final design will be specified and formalized, 170.

In the evaluation of each successive recipe, changes in the physical description, equipment parameters, and control rules may be indicated. Any proposed change in the candidate PIPE design will require that earlier recipes be re-evaluated for satisfactory performance with the new design.

Specifying and formalizing the PIPE design, 170, may well require compromises in terms of performance objectives covering the entire set of process recipes. That is, the best design for the entire set may not be optimal for any one recipe. Another example of a design compromise is to discard one or more recipes from the set; this compromise would typically be done if a recipe required a recipe-specific design.

Examples of PIPE designs which may be developed or evaluated are: number and type of Processing Chambers, number and type of transport elements, number and type of buffers, number and type of PIPEs which are integrated into one PIPE, control rules, etc.

Example 8: Process for PIPE Control

Figure 9:
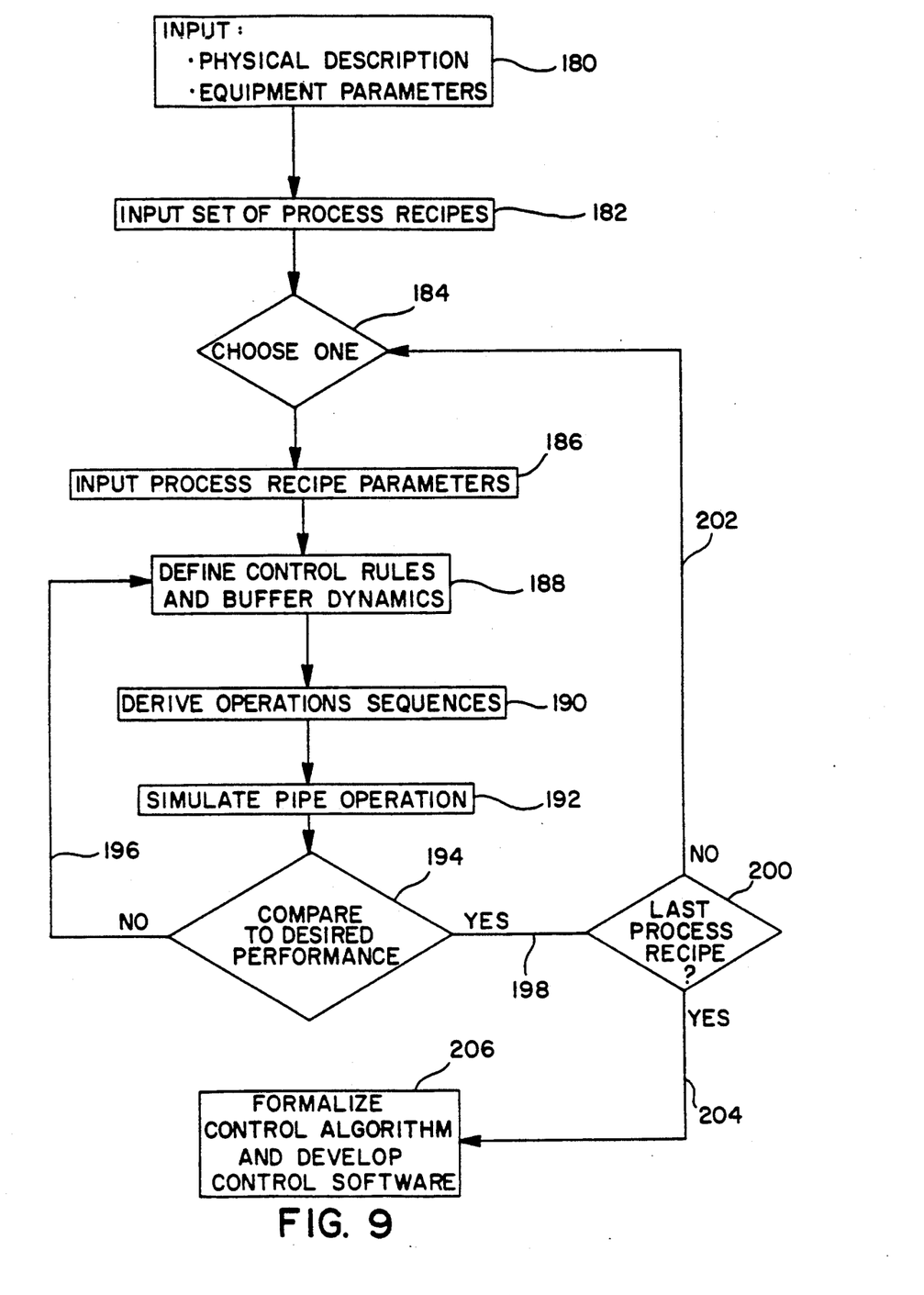
FIG. 9 is still another flow diagram illustrating the use of PIPE-specific models for PIPE control.

FIG. 9 provides a more specific embodiment of the process for PIPE design wherein the specific element under design is the control system. This design problem occurs when the physical configuration of the machine is fixed, but the choice of control schemes remains as a design option. The conventional design alternative is to test control schemes in a hardware prototype of the machine. Testing control schemes with PIPE-specific models is both cost and time effective, and more likely to lead to an optimal scheme due to the ability to explore more options.

In the diagram, the blocks, 180-206, represent the process of developing a PIPE control design that meets a desired performance for a set of specified process recipes. The object of the design process is to develop a control strategy that has satisfactory performance for the target set of process recipes. The result of the design process will be rules for the movement of parts and the control buffer dynamics. Alternative control strategies are evaluated using PIPE-specific models.

As illustrated, the first step in the process, 180, is to input the fixed physical description and the associated equipment parameters. Next, the desired set of process recipes for which the PIPE is to be used are input, 182. From this set, one process recipe is chosen to begin the design process, 184. Based on this process recipe, the process recipe parameters are given, 186. Next, the initial set of control rules and buffer dynamics are specified for consideration, 188. As a result of these choices, a set of operations sequences is derived describing the possible paths for parts movement through the PIPE, 190. The PIPE model is then used for detailed simulation, 192.

The projected behavior of PIPE for the proposed control rules and buffer dynamics is compared to the desired performance specifications, 194. In an iterative process of design, 196, changes in the rules for part movement and buffer dynamics are made and evaluated.

When a satisfactory design for one process recipe from the step is achieved, 198, another process recipe from the set will be evaluated, 202. When a satisfactory design is found for all recipes in the set, then the final design will be specified and formalized, 206.

In the evaluation of each successive recipe, changes in the control rules and buffer dynamics may be indicated. Any proposed change in the candidate PIPE control design will require that earlier recipes be re-evaluated for satisfactory performance with the new control design.

Specifying and formalizing the PIPE control design, 206, may well require compromises in terms of performance objectives covering the entire set of process recipes. That is, the best design for the entire set may not be optimal for any one recipe. Another example of a design compromise is to discard one or more recipes from the set; this compromise would typically be done if a recipe required a recipe-specific control scheme.

Further specific details on the implementation of the invention can be found in my above-referenced issued U.S. Pat. No. 4,796,194, the disclosure of which is hereby incorporated by reference herein. The techniques described there will have to be modified in accordance with the above discussion in order to be applicable to a PIPE environment.

It should now be readily apparent to those skilled in the art that a modeling and control process capable of achieving the stated objects of the invention has been provided. The invention provides a process for modeling production integrated processing equipment, also known as cluster tools, modular equipment, track systems, etc. Further, the model produced by this invention is a real-world model in that it is realistic and validatable. In addition, the invention provides a process for developing machine-specific implementations for PIPEs performing such complex processes as plasma etching, plasma deposition, chemical-vapor deposition, physical-vapor deposition, photolithography, photo-resist processing, rapid thermal processing, and oxidation, as well as other processes. The PIPE-specific model can be used for performance analysis. The effect of changes in process times, process recipes, and process mixtures on cycle time, throughput, resource utilization, and bottlenecks can be analyzed. These PIPE models may be used in the design or redesign of PIPEs. Further, the PIPE-specific model can be used to control material movement in the PIPE, including buffer dynamics. The PIPE-specific models may be used as part of computer-integrated manufacturing systems that control factories. The recent introduction of this equipment precludes prior art in the field of real-world modeling and control of these complex PIPE systems.

It should further be apparent to those skilled in the art that various changes in form and details of the invention as shown and described may be made. It is intended that such changes be included within the spirit and scope of the claims appended hereto.

What is claimed is:

1. A process for modeling production integrated processing equipment (PIPE), which comprises identifying sufficient physical elements within the PIPE between which parts move while within the PIPE so that the parts within the PIPE may be attributed to one of the physical elements at all times while the parts are within the PIPE, constructing a data structure representing the physical elements, listing events occurring in the physical elements, mapping each event onto the data structure, defining the generation of dynamic events, including new events from old events, inputting PIPE specific data, implementing the dynamic events using discrete-event simulation, collecting statistics on performance variables to define and refine the operating rules and buffer dynamics which specify how the parts interact with the physical elements in actual operation of the PIPE, using a resulting model to simulate operation of the PIPE, comparing predictions obtained with the simulation with observed trends in the PIPE, and using the comparison to further refine the choice of fundamental rules and parameters.

2. The process of claim 1 additionally comprising the step of grouping the physical elements in the PIPE by function, and in which operations steps are assigned to the physical elements.

3. The process of claim 1 in which operations sequences in the PIPE are dynamic.

4. The process of claim 1 in which operations sequences in the PIPE follow a strict routing.

5. The process of claim 1 in which the PIPE is a track system.

6. The process of claim 1 additionally comprising the steps of generating control rules for the movement of parts through the PIPE, including buffer dynamics.

7. The process of claim 1 in which the model is used for analysis of operating algorithms to avoid machine lock-up in the movement of the parts between the physical elements.

8. The process of claim 1 in which the model is used for analysis of routing, cycle time, and throughput trade-offs.

9. The process of claim 1 in which the PIPE contains at least one process step chosen from the following set: plasma etching, plasma deposition, chemical-vapor deposition, physical-vapor deposition, photolithography, photo-resist processing, rapid thermal processing, and oxidation.

10. The process of claim 1 wherein the comparison to experimental data is used to provide a validated model.

11. A process for modeling a production integrated processing equipment (PIPE) which has operations sequences consisting of process steps, material movement, and buffer dynamics in which a model describing actual operation of the PIPE is obtained, which comprises choosing a dynamic model for the PIPE including control rules to prevent machine lock-up in movement of parts between physical elements of the PIPE, determining a set of parameters that describe the PIPE including sufficient physical elements within the PIPE between which the parts move while within the PIPE so that the parts within the PIPE may be attributed to one of the physical elements at all times while the parts are within the PIPE, describing the parameters in terms of data structures of the chosen model, the chosen PIPE-specific dynamic model containing descriptions of the dynamic interactions of parts and the physical elements in the PIPE, simulating the dynamic behavior of the PIPE using the chosen PIPE-specific dynamic model, comparing predictions obtained with the simulation using the model with observed trends in the PIPE, and using the comparison to refine and validate the model.

12. The process of claim 11 in which operations sequences in the PIPE are dynamic.

13. The process of claim 11 in which the PIPE is a track system.

14. The process of claim 11 additionally comprising the steps of using the model for PIPE performance analysis to determine the effect of changes in process times, process recipes, and process mixtures on cycle time, throughput, resource utilization, and bottlenecks.

15. The process of claim 11 additionally comprising the steps of using the model for PIPE design.

16. The process of claim 11 additionally comprising the steps of using the model for control of the PIPE, including parts movement, physical element loadings and parts processing.

17. The process of claim 11 in which the model is used for analysis of routing, cycle time and throughput trade-offs.

18. The process of claim 11 additionally comprising the steps of identifying which phenomena in the PIPE are stochastic in nature, and assigning distributions and parameters of the distributions to the stochastic phenomena.

19. The process of claim 11 additionally comprising the step of grouping the physical elements in the PIPE by function, and in which process steps are assigned to the physical elements.

20. The process of claim 11 additionally comprising the steps of generating control rules for the movement of parts through the PIPE, including buffer dynamics.

21. The process of claim 11 in which the model is used for analysis of operating algorithms to avoid machine lock-up in the movement of the parts between the physical elements.

22. The process of claim 11 in which the PIPE contains at least one process step chosen from the following set: plasma etching, plasma deposition, chemical-vapor deposition, physical-vapor deposition, photolithography, photo-resist processing, rapid thermal processing, and oxidation.

23. The process for modeling a PIPE of claim 11 in which the definition of the PIPE is used to choose a model on the basis of the match between dynamic characteristics of the model and the PIPE definition, and defining additional parameters of fundamental rules from production data of the PIPE to give a validated model.

24. The process of claim 23 additionally comprising the steps of using the model for PIPE design or redesign.

25. In a process for dynamic, real world modeling of a production integrated processing equipment (PIPE) including the steps of specifying machine components in the PIPE and defining lots of parts manufactured in the PIPE, the improvement which comprises specifying sufficient machine components between which the parts move while within the PIPE so that the parts within the PIPE may be attributed to one of the machine components at all times while the parts are within the PIPE, defining a model including dynamic operations sequences as an ordered sequence of operations steps which changes in time as a result of PIPE conditions by using a definition of the PIPE to choose the model on the basis of the match between dynamic characteristics of the model and of the PIPE definition, delineating a set of PIPE operating rules which define how part lots interact with the machine components in actual operation of the PIPE, defining additional parameters of fundamental rules from production data of the PIPE to validate the model, and using the validated model to control the PIPE to avoid machine lock-up in movement of the parts between the machine components.

26. The process of claim 25 in which the operations sequences in the PIPE are dynamic.

27. The process of claim 25 in which the PIPE is a track system.

28. The process of claim 25 additionally comprising the steps of using the model for PIPE performance analysis to determine the effect of changes in process times, process recipes, and process mixtures on cycle time, throughput, resource utilization, and bottlenecks.

29. The process of claim 25 additionally comprising the steps of using the model for PIPE design or redesign.

30. The process of claim 25 additionally comprising the steps of using the model for control of the PIPE, including parts movement, machine component loadings and parts processing.

31. The process of claim 25 in which the model is used for analysis of routing, cycle time and throughput trade-offs.

* * * * *